(12) United States Patent
Akahane

(10) Patent No.: US 6,438,314 B1
(45) Date of Patent: Aug. 20, 2002

(54) RECORDING AND REPRODUCING DEVICE AND METHOD OF REPRODUCING VIDEO INFORMATION ON VARIABLE-VELOCITY BASIS

(75) Inventor: Shigeru Akahane, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/207,981

(22) Filed: Dec. 3, 1998

Related U.S. Application Data

(63) Continuation of application No. PCT/JP98/01566, filed on Apr. 3, 1998.

(30) Foreign Application Priority Data

Apr. 3, 1997 (JP) .............................................. 9-085415

(51) Int. Cl.$^7$ .............................................. H04N 5/783
(52) U.S. Cl. .............................. 386/68; 386/77; 386/52
(58) Field of Search .............................. 386/4, 52, 6–8, 386/55, 64, 68, 45, 77, 81, 82; 360/13, 73.01, 73.03, 73.04, 73.05, 73.08, 73.09, 74.1; 369/83; H04N 5/76, 5/781, 9/79, 5/783

(56) References Cited

U.S. PATENT DOCUMENTS 5,461,487 A * 10/1995 Asakura ...................... 386/71
6,122,129 A * 9/2000 Aoki et al. ............... 360/73.06
6,137,947 A * 10/2000 Ohta et al. ..................... 386/68
6,226,447 B1 * 5/2001 Sasaki et al. ............... 386/112

FOREIGN PATENT DOCUMENTS

| JP | 2-73475 | 3/1990 |
|---|---|---|
| JP | 6-165117 | 6/1994 |
| JP | 8-138318 | 5/1996 |

* cited by examiner

Primary Examiner—Thai Tran
(74) Attorney, Agent, or Firm—Frommer Lawrence & Haug LLP; William S. Frommer

(57) ABSTRACT

Video information can be smoothly played back without producing a frame jump even if an externally-instructed playback velocity changes every moment. The present invention comprises a hard disk 11 for storing video information D1 corresponding to n frames therein, two buffer memories 13A and 13B for respectively inputting video information D1 corresponding to continuous m frames therein and outputting the video information D1 while changing writing and reading, means 14 for reproducing the video information D1, and a CPU 23 for alternately writing video information D1 into the memories 13A and 13B based on the playback velocity so that video information D1 corresponding to several frames overlap, determining a slow reproducible playback velocity range according to the video information D1, correcting the playback velocity so as to fall within the playback velocity range, and thereafter reading the video information D1 into the reproducing means 14 from the memories 13A and 13B based on the corrected playback velocity.

3 Claims, 6 Drawing Sheets

| MEMORY 13A | FRAME 0 | FRAME 1 | FRAME 2 | FRAME 3 | FRAME 4 |
|---|---|---|---|---|---|
| MEMORY 13B | FRAME 2 | FRAME 3 | FRAME 4 | FRAME 5 | FRAME 6 |

| MEMORY 13A | FRAME 0 | FRAME 1 | FRAME 2 | FRAME 3 | FRAME 4 |
|---|---|---|---|---|---|
| MEMORY 13B | FRAME 3 | FRAME 4 | FRAME 5 | FRAME 6 | FRAME 7 |

FIG. 6

| MEMORY 13A | FRAME 3 | FRAME 4 | FRAME 5 | FRAME 6 | FRAME 7 |
|---|---|---|---|---|---|
| MEMORY 13B | FRAME 3 | FRAME 4 | FRAME 5 | FRAME 6 | FRAME 7 |

FIG. 7

| MEMORY 13A | FRAME 1 | FRAME 2 | FRAME 3 | FRAME 4 | FRAME 5 |
|---|---|---|---|---|---|
| MEMORY 13B | FRAME 3 | FRAME 4 | FRAME 5 | FRAME 6 | FRAME 7 |

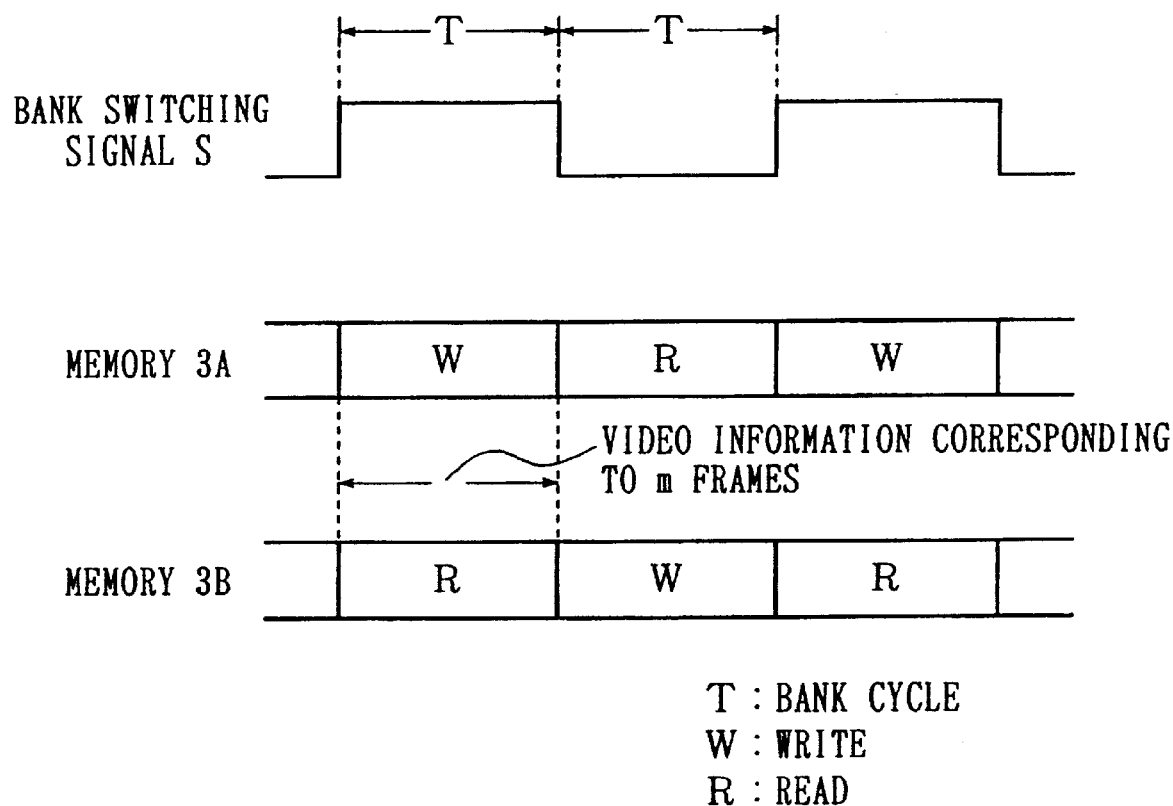

RECORDING AND REPRODUCING DEVICE AND METHOD OF REPRODUCING VIDEO INFORMATION ON VARIABLE-VELOCITY BASIS

This is a continuation of copending International Application PCT/JP98/01566 having an international filing date of Apr. 3, 1998.

TECHNICAL FIELD

This invention relates to a recording and reproducing device suitable for application to a variable-velocity playback type digital video recording and reproducing device capable of performing smooth and good-response variable-velocity reproduction, and a method of reproducing video information on a variable-velocity basis.

BACKGROUND ART

A digital video recording and reproducing device using a hard disk is normally large in memory capacity and needs a long access time. An information reading system using buffer memories provided in two-bank configurations has been adopted to reduce this access time. In the present system, video information is read from the other of one pair of general-purpose buffer memories when video information is written into one of the pair. Thus, the switching between the writing of the video information into one buffer memory and the reading of the video information from the other buffer memory is periodically done to sequentially record and reproduce or play back the video information. A dual port memory is known as a memory device for implementing such functions on a unitary basis.

FIG. 8 is a conceptional view showing a configuration of this type of digital video recording and reproducing device. In FIG. 8, a write and read-only controller 2 is electrically connected to a hard disk 1 so as to perform such control as to read video information corresponding to continuous m frames from video information corresponding to n frames. A keyboard 5 is electrically connected to the controller 2 to provide instructions for a playback velocity for video information through the use of a search dial SA provided in the keyboard 5.

Buffer memories 3A and 3B provided in two-bank configurations are electrically connected to the controller 2. Video information is read from the hard disk 1 in accordance with a reproduce or playback velocity and alternately written into the buffer memories 13A and 13B. In order to locate the start of an image or picture, for example upon video editing work executed by using this type of digital video recording and reproducing device, the image must be normally played back slowly. At this time, the image is reproduced at an arbitrary playback velocity (corresponding to a velocity given by an operator) less than or equal to a one-time velocity.

This playback velocity is specified or designated by the search dial 5A. A playback circuit 4 is electrically connected to the output-stage sides of the buffer memories 3A and 3B so that video information alternately read from the buffer memories 3A and 3B is reproduced. In this type of recording and reproducing device, the video information is read from each of the buffer memories 3A and 3B based on a bank period or cycle T to simplify an algorithm wherever practicable. The bank cycle T indicates a period in which the video information is written into or read from each of the buffer memories 3A and 3B.

Operation in a one-time velocity playback mode will next be described. First, an operator designates a playback velocity. Video information is read into the buffer memory 3A from the hard disk 1 in frame units at the designated playback velocity. At this time, video information corresponding to m frames are collectively read from the hard disk land written into the buffer memory 3A.

When the writing of the video information into the buffer memory 3A is completed, the bank cycle T is switched to another as shown in FIG. 9. The bank cycle T is always constant regardless of the playback velocity designated by the operator and is changed every m frames. With its changeover, the writing of video information into the buffer memory 3B is started and at the same time the reading of video information from the buffer memory 3A to the playback circuit is started. The video information read from the buffer memory 3A is reproduced by the playback circuit 4.

Further, when the writing of the video information into the buffer memory 3B and the reading of the video information from the buffer memory 3A are completed, the bank cycle T is switched to another. With its switching, the reading of video information from the buffer memory 3B is started and at the same time the writing of video information into the buffer memory 3A is started. The video information read from the buffer memory 3B is reproduced by the playback circuit 4.

Thus, the video recording and reproducing device using the buffer memories 3A and 3B provided in the two-bank configurations has a feature in that if a one-time velocity playback mode is adopted, video information can be sequentially recorded and reproduced without depending on an expensive dual port memory.

On the other hand, when an arbitrary playback velocity (including a still playback zero velocity) less than or equal to a one-time velocity is designated, a frame skip or jump will occur upon bank switching.

When the operator locates the start of a picture or image through the use of the search dial 5A, for example, a playback velocity less than or equal to a one-time velocity is designated. Video information is read into each of the buffer memories 3A and 3B from the hard disk 1 in frame units in accordance with this playback velocity. However, the playback velocity designated by the operator varies every moment for video retrieval. Further, a long access time is required to read the video information from the hard disk 1 to the buffer memories 3A and 3B in the frame units.

Therefore, a considerable time is required until the video information is outputted to the playback circuit 4 since the operator has designated the playback velocity. Thus, a problem arises in that variable-velocity reproduction very poor in response would be made.

In the conventional recording and reproducing device as well, the switching between the buffer memories 3A and 3B is performed every m frames on the basis of the bank cycle T regardless of the playback velocity.

Even when, for example, a video start portion approaches and at this time, it is desired to further sequentially read the video information of one buffer memory 3A without depending on the previously-designated playback velocity in order to slowly play back the video information thereof, the buffer memory 3A is switched over to the buffer memory 3B.

Therefore, the video information stored in the other buffer memory 3B must be read into the playback circuit 4 for slow reproduction in spite of the fact that it is desired to read the video information corresponding to the same frames into the playback circuit 4 from the buffer memory 3A. Thus, video information corresponding to continuous frames are not read from the buffer memories 3A and 3B and video information corresponding to discontinuous or skipping frames are outputted to the playback circuit 4. This offers a problem that a so-called frame skip or jump occurs and hence smooth slow reproduction cannot be achieved.

Thus, when reading control is performed while an algorithm for determining frames for video information to be written into the buffer memories 3A and 3B from the hard disk 1 and an algorithm for determining frames for video information to be outputted to the playback circuit 4 from the buffer memories 3A and 3B are being associated with one another, the frame units to be handled differ from each other between the writing of the video information to the buffer memories 3A and 3B and the reading of the video information from the buffer memories 3A and 3B, whereby the conventional variable-velocity playback system will result in a very complex one.

With the foregoing problems in view, it is therefore an object of the present invention to provide a recording and reproducing device capable of eliminating the occurrence of frame jumps upon bank switching even if an externally-instructed playback velocity varies every moment, and a method of reproducing video information on a variable-velocity basis.

DISCLOSURE OF THE INVENTION

A recording and reproducing device of the present invention comprises recording means for storing video information corresponding to n frames (where n=0, 1, 2, 3 . . . ) therein, two memories for inputting video information corresponding to continuous m frames (where m<n) from the recording means and outputting the video information while performing switching between a function for writing the video information therein and a function for reading the video information therefrom, reproducing means for playing back the video information outputted from the memories, instructing means for designating a velocity for playing back the video information by the reproducing means, and control means for performing control for alternately writing the video information corresponding to the m frames made continuous so that video information corresponding to several frames overlap, into the two memories based on the playback velocity specified by the instructing means, and performing control for determining a slow reproducible playback velocity range according to the video information corresponding to the m frames, correcting the playback velocity given by the instructing means so as to fall within the playback velocity range, and thereafter reading the video information corresponding to the corresponding frame determined based on the corrected playback velocity.

In the recording and reproducing device of the present invention, when a playback velocity is designated by the instructing means, video information corresponding to continuous m frames, including overlapped video information is alternately written into two memories based on the playback velocity. Along with this, a slow reproducible playback velocity range is determined from the video information corresponding to the m frames, including the video information corresponding to the overlap by the control means. The playback velocity given by the instructing means is corrected so as to fall within the playback velocity range. Further, a frame for video information is determined based on the corrected playback velocity and the video information corresponding to the frame is read into reproducing means from the two memories.

Thus, since the playback velocity is limited to the slow reproducible playback velocity range even if an operator designates such a large playback velocity as to develop a frame skip or jump, no frame jump occurs and the video information can be slowly reproduced based on the corrected playback velocity.

Consequently, a recording and reproducing device can be provided which is capable of reproducing a smooth image upon location of the start of the image, for example even if an externally-instructed playback velocity varies every moment, and quickly responding to playback instructions issued by the operator.

In a method of reproducing video information on a variable-velocity basis, an algorithm related to control on the reading of video information into a hard disk and an algorithm related to control on the reading of video information from each buffer memory can be separated from one another. Thus, a recording and reproducing device can be constructed which makes it possible to simplify its system and is strong against disturbance.

The above-described recording and reproducing device is extremely suitable for application to a variable-velocity playback type digital video recording and reproducing device.

BRIEF DESCRIPTION OF THE DRAWINGS

FIG. 6 illustrates frame numbers stored in the buffer memories 13A and 13B at bank switching, according to the present embodiment;

FIG. 7 depicts frame numbers stored in buffer memories 13A and 13B at bank switching according to a comparative example;

FIG. 9 is an operation timing chart in a double-velocity playback mode of the conventional recording and reproducing device.

BEST MODE FOR CARRYING OUT THE INVENTION

Preferred embodiments of the present invention will hereinafter be described with reference to the accompanying drawings.

Figure 1:
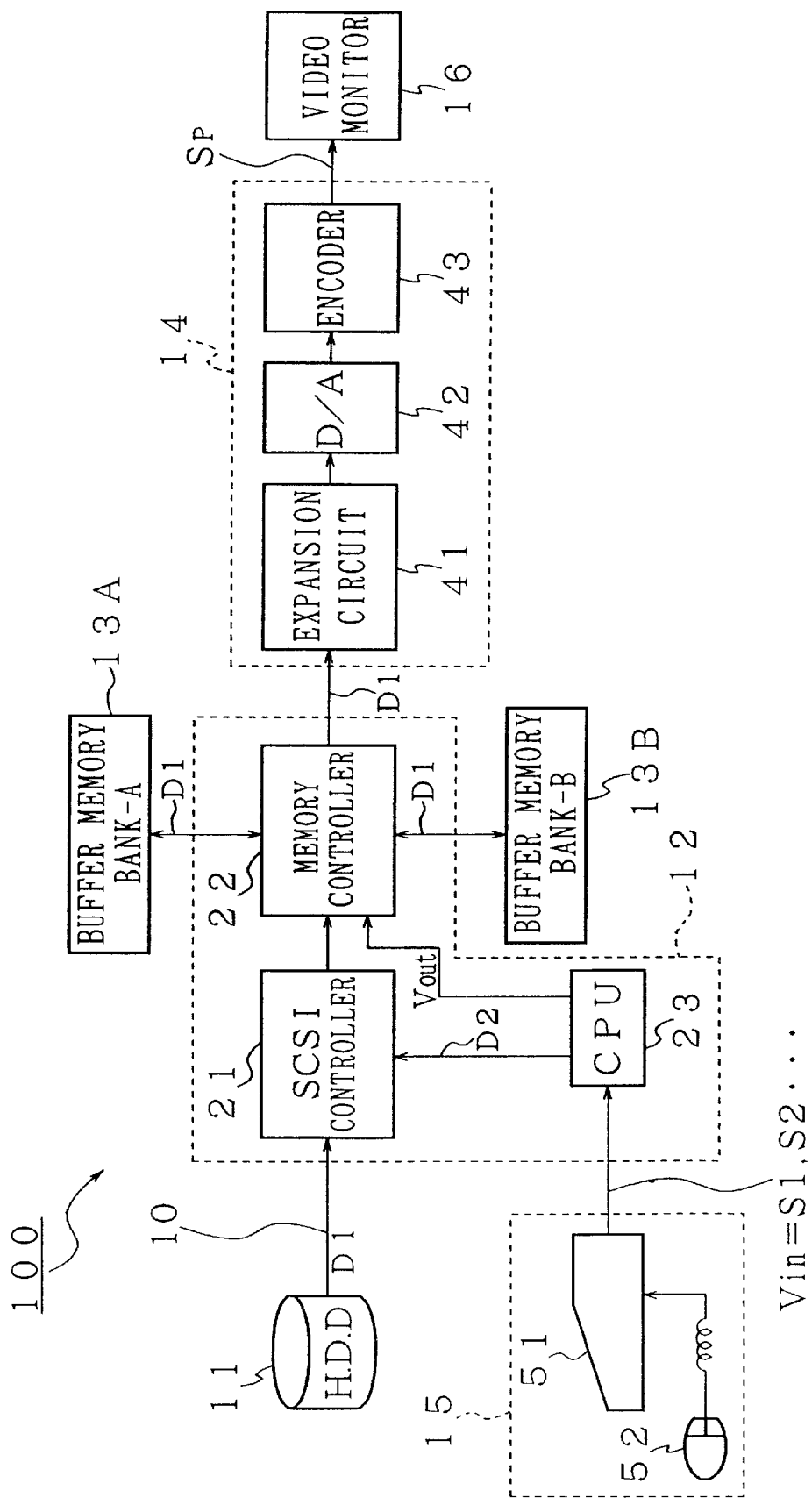
FIG. 1 is a diagram showing a configuration of a recording and reproducing device used as an embodiment of the present invention.

FIG. 1 is a diagram showing a configuration of a recording and reproducing device 100 used as an embodiment of the present invention. In the present embodiment, video information corresponding to continuous m (where m: integer) frames including overlapped or superimposed video information corresponding to several frames is alternately written into two memories based on an externally-instructed reproduce or playback velocity. Along with this, a slow reproducible playback velocity range is determined according to the video information corresponding to the m frames including the overlap video information. After the playback velocity has been corrected so as to fall within the playback velocity range, the video information is read from the corresponding memory based on the corrected playback velocity. Thus, variable-velocity reproduction smooth and good in response can be performed.

In FIG. 1, a random accessible hard disk 11 used as recording means is electrically connected to an SCSI bus 10 and video information D1 corresponding to n frames (where n=0, 1, 2, 3 . . . ) is stored in the random accessible hard disk 11. Control means 12 is electrically connected to the hard disk 11 so as to perform control for reading video information D1 corresponding to continuous m frames (m<n). Two-bank configured buffer memories 13A and 13B are electrically connected to the control means 12 so that the video information D1 corresponding to the m frames read from the hard disk 11 is alternately written therein. Since the adoption of such two-bank configuration allows the use of a general purpose memory device, the cost of the device can be brought down.

Reproducing means 14 is electrically connected to the buffer memories 13A and 13B through the control means 12 so that the video information D1 corresponding to the m frames read alternately by the control means 12 is reproduced. Further, designating or instructing means 15 is electrically connected to the control means 12 so as to be able to designate the velocity for reproducing the video information D1 by the reproducing means 14.

The recording and reproducing device 100 suitable for application to the variable-velocity playback type digital video recording and reproducing device is constructed in this way.

The recording and reproducing device 100 according to the present embodiment performs such control as to record the video information D1 overlapped between the two buffer memories 13A and 13B and read the overlap video information D1 for a time interval required to perform the next bank switching while attention is being given to the overlapping video information D1.

That is, when the playback velocity of the video information D1 is designated by the instructing means 15, the control means 12 alternately writes the video information D1 corresponding to the continuous m frames including the overlap video information D1 into the two buffer memories 13A and 13B, based on the playback velocity. Correspondingly, the control means determines a slow reproducible playback velocity range from the video information D1 corresponding to the m frames including the overlap video information D1. Thereafter, the playback velocity is corrected so that the playback velocity designated by the instructing means falls within the playback velocity range. A frame for the video information D1 is determined based on the corrected playback velocity (hereinafter called "target playback velocity"). The video information D1 corresponding to the frame is read into the reproducing means 14 from the two buffer memories 13A and 13B.

Thus, since the target playback velocity is limited to the slow reproducible playback velocity range even if an operator specifies or designates such a large playback velocity as to produce a frame skip or jump through the instructing means 15, the video information D1 can be slowly reproduced based on the target playback velocity without producing the frame jump.

(Embodiments)

The recording and reproducing device 100 capable of reproducing or playing back the video information D1 on a varying-velocity basis first determines the maximum playback velocity and the minimum playback velocity, based on the video information D1 corresponding to the continuous m frames including the overlap video information corresponding to the several frames. Thereafter, the recording and reproducing device 100 imposes a limitation on a playback velocity externally instructed based on the maximum playback velocity and the minimum playback velocity. Further, the playback frame numbers for the video information D1 read from the buffer memories 13A and 13B are determined on the basis of the latest target playback velocity subjected to the limitation.

In the present embodiment, digitally-compressed video information (hereinafter called simply "video information") D1 compressed upon data storage is stored in the hard disk 11. As shown in FIG. 1, the control means 12 used as the embodiment comprises an SCSI controller 21, a memory controller 22 and a central processing unit (hereinafter called "CPU"; central processing unit) 23 based on the SCSI (Small Computer System Interface) protocol.

The SCSI controller 21 is electrically to the SCSI bus 10 to perform control for reading continues video information D1 corresponding to, e.g., 5 (m=5) frames into the buffer memories 13A and 13B from the hard disk 11. This reading control will be described later.

The memory controller 22 is electrically connected to the SCSI controller 21 to perform control for alternately writing video information D1 into the buffer memories 13A and 13B. Along with this, the memory controller 22 performs control for alternately reading the video information D1 from the buffer memories 13A and 13B.

The offer memories 13A and 13B respectively have the function of writing therein the video information D1 read from the hard disk 11 and the reading function of outputting the video information D1 to the reproducing means 14, based on playback velocities vin=S1, S2, . . . instructed by the operator. The writing and reading are shared between the buffer memories 13A and 13B and their functions are switched over based on a bank period or cycle T. As a result, the reading of the continuous video information D1 is assured.

Table 1 shows the playback velocity Vin instructed by the operator and the states of reading/writing of the buffer memories 13A and 13B. Table 1 illustrates an example in which bank switching is done in a 5-frame cycle.

TABLE 1

| Time (frame) | Playback velocity Vin | Write | Read |
|---|---|---|---|
| 01 | S1 | BANK-A | BANK-B |
| 02 | S2 | BANK-A | BANK-B |
| 03 | S3 | BANK-A | BANK-B |
| 04 | S4 | BANK-A | BANK-B |
| 05 | S5 | BANK-A | BANK-B |
| 06 | S6 | BANK-B | BANK-A |
| 07 | S7 | BANK-B | BANK-A |
| 08 | S8 | BANK-B | BANK-A |
| 09 | S9 | BANK-B | BANK-A |
| 10 | S10 | BANK-B | BANK-A |
| 11 | S11 | BANK-A | BANK-B |
| 12 | S12 | BANK-A | BANK-B |
| . | . | . | . |
| . | . | . | . |
| . | . | . | . |

In Table 1, video information D1 is read into the buffer memory (BANK-A) 13A from the hard disk 11 during five frames ranging from frames 01 to 05. Whether video information D1 corresponding to any frame number should be read from the buffer memory (BANK-B) 13B, is determined according to timing of the frame 01, based on the playback velocity Vin designated by the operator before the frame 01. This determining method will be described later.

Further, the video information D1 written between the frames 01 to 05 is outputted from the buffer memory 13A to the reproducing means 14 during five frames ranging from the frames 06 to 10. As the playback velocity Vin used at this time, the latest target playback velocity Vout is used. That is, when the frame is taken as 06, the playback velocity Vin=S6 is used, whereas when the frame is given as 09, the playback velocity Vin=S9 is used.

The CPU 23 is electrically connected to the SCSI controller 21 and the memory controller 22. A keyboard 51 and a mouse 52 each used as the instructing means 15 having a function such as a search dial or the like are connected to the CPU 23 so that playback velocities Vin=01, S2 . . . desired by the operator are inputted to the CPU 23 upon location of the start of an image or the like.

The reproducing means 14 electrically connected to an output stage of the memory controller 22 comprises an expansion circuit 41, a digital-to-analog converter (hereinafter called "D/A converter") 42 and an encoder 43.

The expansion circuit 41 is electrically connected to the output stage of the memory controller 22 so as to expand (decompress) the video information D1 (digitally-compressed video information) read from the buffer memories 13A and 13B. The D/A converter 42 is electrically connected to an output stage of the expansion circuit 41 to convert the digital video information outputted from the expansion circuit 41 into analog video information. The encoder 43 is electrically connected to an output stage of the D/A converter 42 to convert the analog video information to signal form (video display signal Sp) capable of being displayed on a video monitor 16. The video monitor 16 is electrically connected to an output stage of the encoder 43 to display an image thereon based on the video display signal Sp.

The operation of the recording and reproducing device 100 applied as the embodiment will next be described. A description will be made here of the case in which the video information D1 is read from the hard disk 11 at a playback velocity Vin of a double velocity or less.

In order to perform image start location or the like, the operator gives desired playback velocities Vin=S1, S2, S3 . . . to the CPU 23 through the keyboard 51. When the playback velocity Vin is detected by the CPU 23, the CPU 23 issues a read command D2 to the SCSI controller 21. The read command D2 is instructions indicative of "read video information D1 corresponding to a target playback frame number from the hard disk 11".

The SCSI controller 21, which has received the read command D2, determines a playback frame number for video information D1 to be read into the buffer memory 13A or 13B from the hard disk 11 in accordance with the playback velocity Vin given by the operator. The playback frame number is determined from the following equation (1):

Playback frame number=[playback velocity integrated information]+[bank switching information]×[playback velocity information]  (1)

In the above equation, the playback velocity integrated information corresponds to data about the integral of a target playback velocity Vout. Described specifically, an integer portion obtained by dropping the number below the decimal point of the integrated value of the target playback velocity Vout is used as the playback frame number. The target playback velocity Vout is one used when the video information D1 is read from each of the buffer memories 13A and 13B to the reproducing means 14.

The bank switching information indicates the bank cycle T in the form of the number of frames. The playback velocity information indicates the externally-given playback velocities Vin=S1, S2 . . . .

When, for example, the playback velocity integrated information is given as 0 at a time T=0 and the bank cycle is given as 1, i.e., when the playback velocity Vin=0.6-time velocity is sequentially given from the operator, the playback velocity integrated information is given as Table 2 shown below.

TABLE 2

| Time | layback velocity information | Playback frame |
|---|---|---|
| 0 | 0 | frame 0 |
| after one frame | 0.60 | frame 0 |
| after two frames | 1.20 | frame 1 |
| after three frames | 1.80 | frame 1 |
| after four frames | 2.40 | frame 2 |
| after five frames | 3.00 | frame 3 |
| after six frames | 3.60 | frame 3 |
| . | . | . |
| . | . | . |
| . | . | . |

The present Table 2 shows an example in which the playback velocity integrated information varies with the elapse of time and video information D1 corresponding to the frames 0, 0, 1, 1, 2, 3 and 3 are read into the buffer memories 13A and 13B from the hard disk 11.

Figures 2, 3:
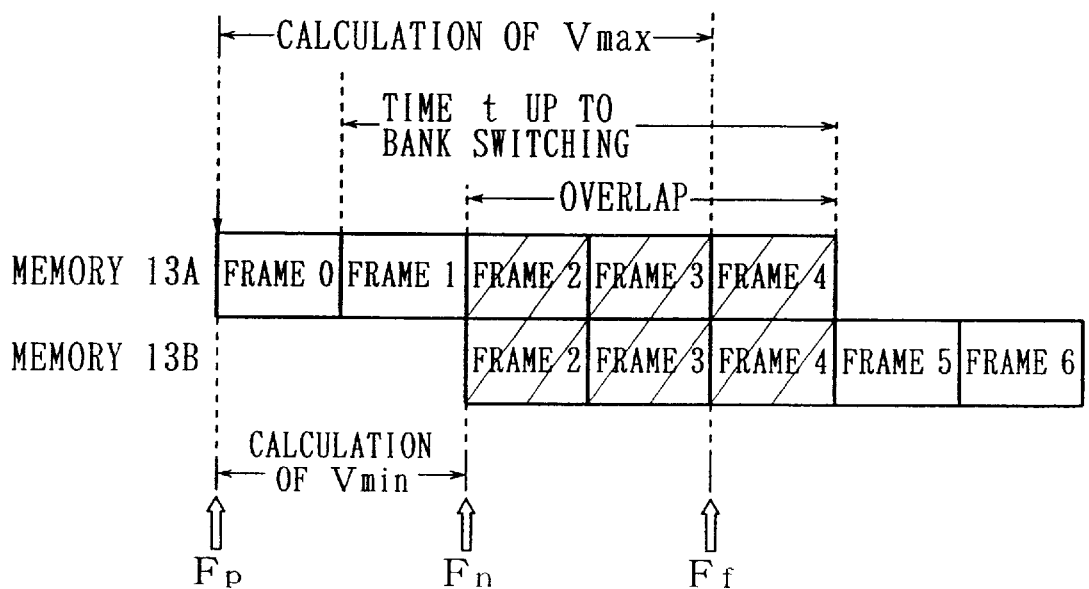
FIG. 2 is a diagram showing examples of frame numbers for video information stored in buffer memories 13A and 13B.
FIG. 3 is a diagram illustrating examples of calculations of the maximum reproduce or playback velocity Vmax and the minimum playback velocity Vmin.

A description will next be made of the operation for reading video information D1 into the expansion circuit 41 from the buffer memories 13A and 13B based on the playback velocity Vin instructed by the operator. In order to provide easy description, a description will be made of the case in which video information D1 corresponding to frames 0 to 4 are written into the buffer memory 13A, video information D1 corresponding to frames 2 to 6 are written into the buffer memory 13B, and the frames 2 to 4 are caused to overlap, as shown in FIG. 2.

Figures 4, 5:
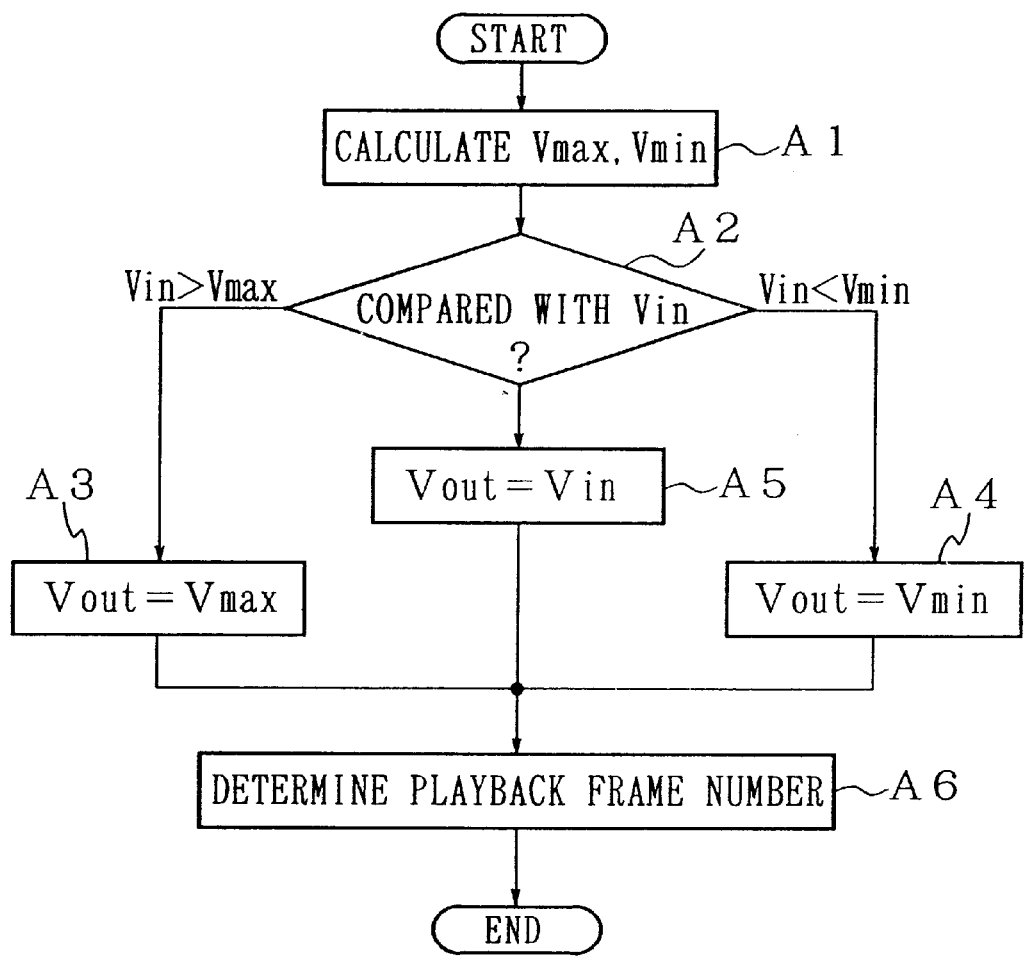
FIG. 4 is a flowchart for determining a playback frame number for video information according to the present embodiment.
FIG. 5 shows frame numbers for video information stored in the buffer memories 13A and 13B according to the present embodiment.
Figure 8:
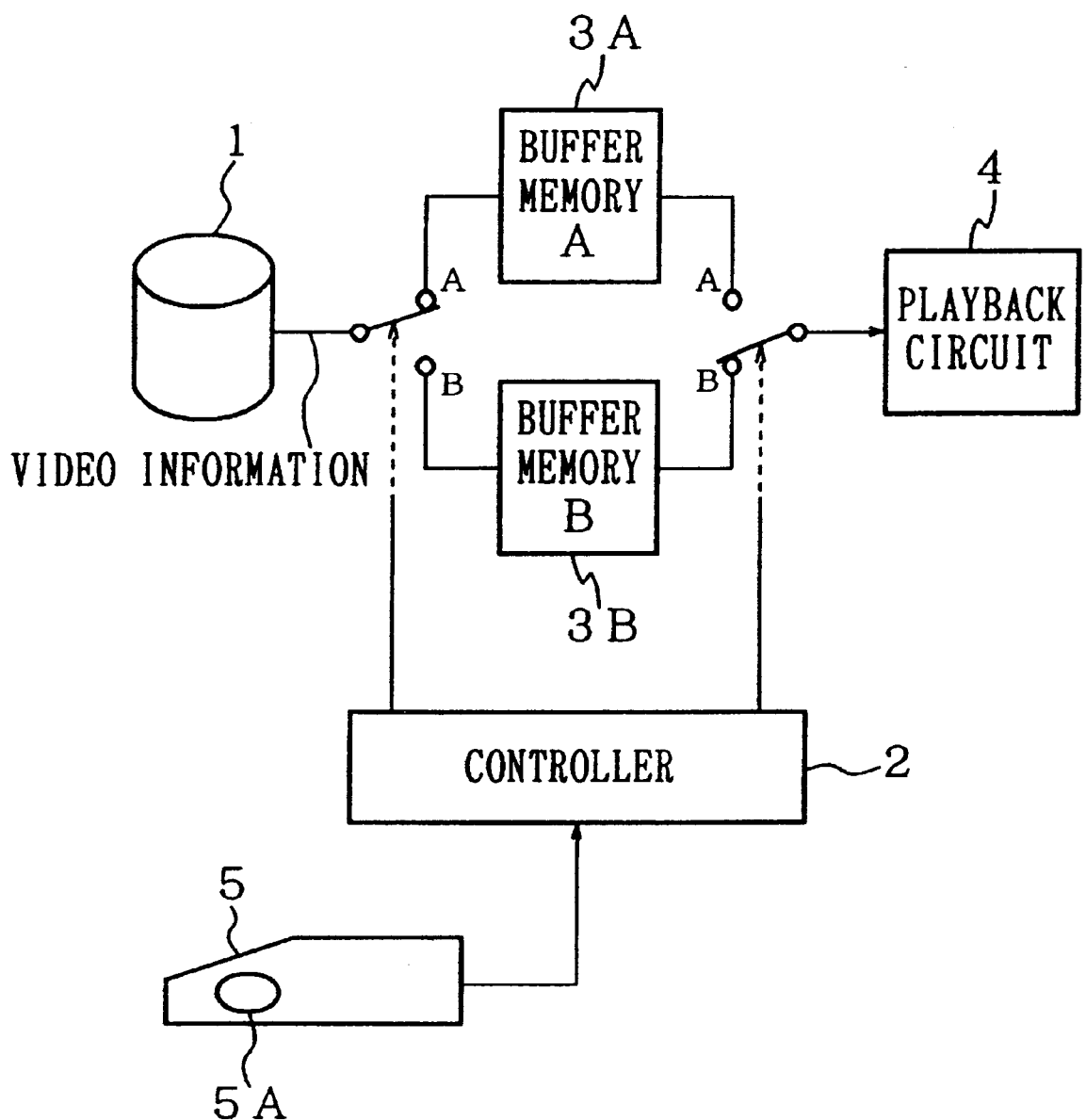
FIG. 8 is a diagram showing a configuration of a conventional recording and reproducing device provided with buffer memories 3A and 3B formed in a two-bank configuration.

FIG. 4 shows a flowchart for determining a frame number for video information D1 to be read into the expansion circuit 41 from each of the buffer memories 13A and 13B. In FIG. 4, the CPU 23 first calculates the maximum playback velocity Vmax and the minimum playback velocity Vmin in Step A1. When the present playback position of the video information D1 read from the buffer memory 13A is represented as Fp (indicated by the frame number), the farthest overlap position is represented as Ff (corresponding to a frame number for the overlap video information D1 read latest) and the time required to change from the reading function of the buffer memory 13A to the reading function of the buffer memory 13B is given by t (corresponding to the number of frames), the maximum playback velocity Vmax is calculated from the following equation (2):

$$Vmax=(Ff-Fp)/t \qquad (2)$$

When the nearest overlap position is represented as Fn (corresponding to a frame number for video information D1 indicative of an overlap part read fastest) with the present playback position Fp as the reference, the minimum playback velocity Vmin is calculated from the following equation (3):

$$Vmin=(Fn-Fp)/t \qquad (3)$$

Thereafter, the minimum playback velocity Vmin and the maximum playback velocity Vmax and the playback velocity Vin instructed by the operator are compared with each other in Step A2. When the playback velocity Vin given by the operator is greater than the maximum playback velocity Vmax (Vin>Vmax) from the result of comparison, the target playback velocity Vout is set to the maximum playback velocity Vmax so as to reach Vout=Vmax in Step A3. When the playback velocity Vin is smaller than the minimum playback velocity Vmin (Vin<Vmin), the target playback velocity Vout is set to the minimum playback velocity Vmin so as to reach Vout=Vmin in Step A4.

When the playback velocity Vin falls within the range from the minimum playback velocity Vmin to the maximum playback velocity Vmax, the playback velocity Vin given by the operator is set as the target playback velocity Vout as it is so as to reach Vin=Vout in Step A5.

In the aforementioned example shown in FIG. 2, the video information D1 overlapped between the buffer memories 13A and 13B ranges from the frames 2 to 4, the present playback position Fp is given as the frame 0, and the farthest overlap position Ff is given as the frame 4. Further, the time t required up to the bank switching corresponds to four frames. Thus, the maximum playback velocity Vmax is obtained from the above equation (2) from these relations:

$$Vmax=(4-0)/4=1$$

Since the nearest overlap position Fn is given as the frame 2, the minimum playback velocity Vmin is obtained from the above equation (3):

$$Vmin=(2-0)/4=0.5$$

Thus, the playback velocity Vin is restricted to a velocity range between a +0.5-time velocity and a +1-time velocity in this example.

In Step A6, a playback frame number for video information D1 to be read into the reproducing means 14 from each of the buffer memories 13A and 13B is determined based on target playback velocity information. The playback frame number is obtained from the following equation (4):

$$\text{Playback frame number}=[\text{playback velocity integrated information}]+[\text{target playback velocity information}] \qquad (4)$$

The target playback velocity information corresponds to a target playback velocity Vout calculated by the CPU 23. Described specifically, an integer portion obtained by dropping or discarding the number below the decimal point of a value obtained by adding the integrated value of the playback velocity Vin and the target playback velocity Vout is used as the playback frame number.

The subsequent operation is similar to that done in the prior art device. The digitally-compressed video information read from each of the buffer memories 13A and 13B is expanded and thereafter the digital video information is converted into analog video information. Afterwards, the analog video information is converted to a video display signal Sp capable of being displayed on the video monitor 16.

Thus, an image is displayed on the video monitor 16 to which the video display signal Sp is inputted. Accordingly, the operator and the recording and reproducing device 100 are capable of performing image start location or the like by continuously repeating instructions for a playback velocity, a correction to the playback velocity, etc.

In the recording and reproducing device 100 according to the present embodiment as described above, an algorithm for determining the playback frame numbers for the video information D1 read into the two buffer memories 13A and 13B from the hard disk 11 and an algorithm for determining the playback frame numbers for the video information D1 read into the reproducing means 14 from the two buffer memories 13A and 13B can be completely separated from one another. Thus, the recording and reproducing device 100 can be constructed which is simple in system and strong against disturbance.

Since the playback frame number outputted to the reproducing means 14 is determined using the latest target playback velocity Vout calculated based on the two algorithms in the present embodiment, the recording and reproducing device 100 can be provided which is capable of reproducing a smooth image without causing the frame jump upon the image start location or the like and quickly responding to reproduce or playback instructions of the operator.

COMPARATIVE EXAMPLES

A comparison of the occurrence of a frame jump will next be made between two cases: one in which the externally-instructed playback velocity Vin is restricted based on the maximum playback velocity Vmax and the minimum playback velocity Vin and another in which the playback velocity Vin is not restricted based on the two.

Comparative conditions are as follows:

1. Bank cycle T will be defined as five frames.
2. Video information corresponding to frames 0 to 4 are stored in the buffer memory 13A for convenience's sake.
3. Time after bank switching will be defined as T.
4. Playback velocity integrated information at a time (T−1) will be defined as 0 (i.e., video information D1 read into the reproducing means 14 at the time T−1 is represented as a frame 0).
5. Playback velocities Vin at respective times ranging from times T to T+5 will be defined as S1=0.6-time velocity, S2=0.3-time velocity, S3=0.1-time velocity, S4=0-time velocity, S5=0-time velocity and S6=0-time velocity respectively.

A method of determining the playback frame numbers for the video information D1 outputted to the reproducing means 14 from the buffer memories 13A and 13B under the above-described comparative conditions will be described below.

[1] When the externally-instructed playback velocity Vin is restricted based on the maximum playback velocity Vmax and the minimum playback velocity Vin, i.e., in the case of the present embodiment, Table 3 is obtained.

TABLE 3

| Time | Instructed playback velocity | Playback frame | Remarks |
|---|---|---|---|
| T | 0.6-time velocity | frame 0 | no frame jumps occur |
| T + 1 | 0.3-time velocity | frame 1 | |
| T + 2 | 0.1-time velocity | frame 2 | |
| T + 3 | 0-time velocity | frame 2 | |
| T + 4 | 0-time velocity | frame 3 | |
| T + 5 | 0-time velocity | frame 3 | |
| . | . | . | |
| . | . | . | |
| . | . | . | |

The video information is reproduced without any frame jump at all the times T to T+5 in Table 3.

(1) Time T:

At this time, a reproduce or playback frame number for video information D1 to be written into the buffer memory 13B from the hard disk 11 is determined. A time interval t spent until the next bank switching is executed, corresponds to five frames. Assuming that no change occurs in the playback velocity Vin=0.6 used till the next bank switching, the corresponding playback frame number for video information D1 to be played back at the next bank switching is calculated from the aforementioned expression (1):

Playback frame number=[playback velocity integrated information]+[bank switching information]×[playback velocity information]=0+5×0.6=3.0

If the number below the decimal point is dropped, then the corresponding playback frame number is given as a frame 3.

Accordingly, video information D1 corresponding to the frames 3 to 7 are read from the hard disk 11 and written into the buffer memory 13B.

Thus, the video information D1 corresponding to the playback frame numbers shown in FIG. 5 are stored in the buffer memories 13A and 13B respectively.

At the time T, a playback frame number for video information D1 outputted from the buffer memory 13A to the reproducing means 14 is determined. First of all, the maximum playback velocity Vmax and the minimum playback velocity Vmin are calculated. The farthest overlap position Ff is represented as the frame 4, the present playback position Fp is represented as the frame 0, and the time t spent till the bank switching is given as the five frames. Thus, the maximum playback velocity Vmax is obtained from the aforementioned equation (2):

$$Vmax = (Ff - Fp)/t$$
$$= (4-0)/5 = 0.8$$

Further, the nearest overlap position Fn is given as the frame 3, the present playback position Fp is given as the frame 0, and the time t spent till the bank switching is given as five frames. Thus, the minimum playback velocity Vmin is determined from the aforementioned equation (3):

$$Vmin = (Fn - Fp)/t$$
$$= (3-0)/5 = 0.6$$

Next, the playback velocity Vin is restricted based on the maximum playback velocity Vmax and the minimum playback velocity Vmin. Since the playback velocity Vin instructed by the operator is equal to S1=0.6-time velocity whereas the minimum playback velocity Vmin is given as 0.6 in the present example, the target playback velocity Vout becomes 0.6 and the playback frame number to be outputted to the reproducing means 14 is calculated from the aforementioned equation (4):

Playback frame number=[playback velocity integrated information]+[target playback velocity information]=0+0.6=0.6

If the number below the decimal point is discarded, then the corresponding playback frame number is represented as the frame 0. Thus, video information corresponding to the frame 0 is outputted to the reproducing means 14 from the buffer memory 13A at the time T.

(2) Time T+1:

At this time, a playback frame number for the next video information D1 to be outputted to the reproducing means 14 from the buffer memory 13A is determined. A time interval t required till bank switching is reduced by one frame and the maximum playback velocity Vmax is determined from the aforementioned equation (2):

$$Vmax=(4-0)/4=1.0$$

Further, the minimum playback velocity Vmin is determined from the above equation (3):

$$Vmin=(3-0)/4=0.75$$

Next, a limitation is imposed to the playback velocity Vin, based on the maximum playback velocity Vmax and the minimum playback velocity Vmin. Since the playback velocity Vin designated by the operator is equal to S2=0.3-time velocity, the minimum playback velocity Vmin is given as 0.75, and the target playback velocity Vout reaches 0.75 in the present example, the playback frame number for video information D1 to be outputted to the reproducing means 14 is determined from the aforementioned equation (4):

$$\text{Playback frame number} = 0.6 + 0.75$$
$$= 1.35$$

If the number below the decimal point is discarded, then the corresponding playback frame number reaches a frame 1. Thus, the video information D1 corresponding to the frame 1 is outputted from the buffer memory 13A to the reproducing means 14 at the time T+1.

(3) Time T+2:

At this time, the present playback position Fp is given as a frame 1 and the corresponding playback frame number for video information D1 to be outputted to the reproducing means 14 from the buffer memory 13A is next determined. A time interval t required till bank switching is further reduced by one frame as compared with the previous one and the maximum playback velocity Vmax is obtained from the aforementioned equation (2):

$$Vmax = (Ff - Fp)/t = (4-1)/3$$
$$= 1.0$$

Further, the minimum playback velocity Vmin is obtained as follows:

$$Vmin = (Fn - Fp)/t = (3-1)/3$$
$$= 0.66$$

Next, the playback velocity Vin is restricted based on the maximum playback velocity Vmax and the minimum playback velocity Vmin. Since the playback velocity Vin instructed by the operator is equal to S3=0.1-time velocity and the minimum playback velocity Vmin is given as 0.66 in the present example, the target playback velocity Vout becomes 0.66. The playback frame number to be outputted to the reproducing means 14 is calculated from the aforementioned equation (4):

Playback frame number=1.35+0.66=2.01

If the number below the decimal point is discarded, then the corresponding playback frame number is represented as the frame 2. Thus, video information D1 corresponding to the frame 2 is outputted to the reproducing means 14 from the buffer memory 13A at the time T+2.

(4) Time T+3:

At this time, the present playback position Fp is given as a frame 2 and the corresponding playback frame number for video information D1 to be outputted to the reproducing means 14 from the buffer memory 13A is next determined. A time interval t required till bank switching is further reduced by one frame as compared with the previous one and the maximum playback velocity Vmax is obtained from the aforementioned equation (2):

$$Vmax = (Ff - Fp)/t = (4-2)/2$$
$$= 1.0$$

Further, the minimum playback velocity Vmin is obtained as follows:

$$Vmin = (Fn - Fp)/t = (3-2)/2$$
$$= 0.5$$

Next, the playback velocity Vin is restricted based on the maximum playback velocity Vmax and the minimum playback velocity Vmin. Since the playback velocity Vin instructed by the operator is equal to S4=0-time velocity and the minimum playback velocity Vmin is given as 0.5 in the present example, the target playback velocity Vout becomes 0.5. The playback frame number to be outputted to the reproducing means 14 is calculated from the aforementioned equation (4):

Playback frame number = 2.01 + 0.5
$$= 2.51$$

If the number below the decimal point is discarded, then the corresponding playback frame number is represented as the frame 2.

Thus, video information D1 corresponding to the frame 2 is outputted to the reproducing means 14 from the buffer memory 13A at the time T+3.

(5) Time T+4:

At this time, the present playback position Fp is given as the frame 2 and the corresponding playback frame number for video information D1 to be outputted to the reproducing means 14 from the buffer memory 13A is next determined. A time interval t required till bank switching is further reduced by one frame as compared with the previous one and the maximum playback velocity Vmax is obtained from the aforementioned equation (2):

$$Vmax = (Ff - Fp)/t = (4-2)/1$$
$$= 2.0$$

Further, the minimum playback velocity Vmin is obtained as follows:

$$Vmin = (Fn - Fp)/t = (3-2)/1$$
$$= 1.0$$

Next, the playback velocity Vin is restricted based on the maximum playback velocity Vmax and the minimum playback velocity Vmin. Since the playback velocity Vin instructed by the operator is equal to S5=0-time velocity whereas the minimum playback velocity Vmin is given as 1.0 in the present example, the target playback velocity Vout becomes 1.0. The playback frame number to be outputted to the reproducing means 14 is calculated from the aforementioned equation (4):

Playback frame number = 2.51 + 1.0
$$= 3.51$$

If the number below the decimal point is discarded, then the corresponding playback frame number is represented as a frame 3.

Thus, video information D1 corresponding to the frame 3 is outputted to the reproducing means 14 from the buffer memory 13A at the time T+4.

(6) Time T+5:

At this time, a reproduce or playback frame number for video information D1 to be written into the buffer memory 13A from the hard disk 11 is determined. A time interval required until the next bank switching is executed, corresponds to five frames. Assuming that no change occurs in the playback velocity Vin used till the next bank switching, video information D1 corresponding the playback frame number, to be played back or reproduced at the next bank switching is calculated from the aforementioned expression (1) in the following manner:

Playback frame number = 3.51 + 5 × 0
$$= 3.51$$

If the number below the decimal point is dropped, then the corresponding playback frame number is given as a frame 3.

Accordingly, video information D1 corresponding to the frames 3 to 7 are read from the hard disk 11 and written into the buffer memory 13A.

Thus, the video information D1 corresponding to the playback frame numbers shown in FIG. 6 are stored in the buffer memories 13A and 13B respectively.

At this time (T+5), a playback frame number for video information D1 outputted from the buffer memory 13B to the reproducing means 14 is determined. Here, the bank switching occurs and hence the video information D1 from the buffer memory 13B is outputted to the reproducing means 14. The playback frame numbers to be outputted to the reproducing means 14 are calculated from the above equations (2) to (4).

At this time (T+5), the present playback position Fp is represented as the frame 3, the farthest overlap position Ff is represented as the frame 7, and the time t spent till the bank switching is given as the five frames. Thus, the maximum playback velocity Vmax is obtained from the aforementioned equation (2):

$$Vmax = (Ff - Fp)/t = (7-3)/5$$

$$= 0.8$$

Further, since the nearest overlap position Fn is given as the frame 3, the minimum playback velocity Vmin is determined as follows:

$$Vmin = (Fn - Fp)/t = (3-3)/5$$

$$= 0.0$$

Next, the playback velocity Vin is restricted based on the maximum playback velocity Vmax and the minimum playback velocity Vmin. Since the playback velocity Vin instructed by the operator is equal to S6=0-time velocity and the minimum playback velocity Vmin is given as 0.0 in the present example, the target playback velocity Vout becomes 0.0 and the playback frame number to be outputted to the reproducing means 14 is calculated from the aforementioned equation (4):

$$\text{Playback frame number} = 3.51 + 0.0$$

$$= 3.51$$

If the number below the decimal point is discarded, then the corresponding playback frame number is represented as the frame 3.

Since the video information D1 corresponding to the frame 3 is stored in the buffer memory 13B at the time (T+5) in the present embodiment as described above, the video information D1 corresponding to the frame 3 can be sequentially outputted to the reproducing means 14. Thus, no frame jump occurs. While the aforementioned comparative examples are illustrated by way of example, it can be understood that the frame jump can be prevented from occurring in an arbitrary playback velocity Vin (0≦Vin≦1.0) given by the operator.

[2] On the other hand, when the externally-instructed playback velocity Vin is restricted based on the maximum playback velocity Vmax and the minimum playback velocity Vin, a frame jump occurs as shown in Table 4. Comparative conditions are given as mentioned above.

TABLE 4

| Time | Instructed playback velocity | Playback frame | Remarks |
|---|---|---|---|
| T | 0.6-time velocity | frame 0 | |
| T + 1 | 0.3-time velocity | frame 0 | |
| T + 2 | 0.1-time velocity | frame 1 | |
| T + 3 | 0-time velocity | frame 1 | |
| T + 4 | 0-time velocity | frame 1 | ← frame |

TABLE 4-continued

| Time | Instructed playback velocity | Playback frame | Remarks |
|---|---|---|---|
| T + 5 | 0-time velocity | frame 3 | jump occurs |
| . | . | . | |
| . | . | . | |
| . | . | . | |

According to Table 4, a frame jump occurs at a time T+5 to produce a feeling of physical disorder.

The reason why such a frame jump occurs is that a playback frame number to be read from each of the buffer memories 13A and 13B is determined based on the old or past playback velocity Vin which remains used when video information D1 is read into each of the buffer memories 13A and 13B from the hard disk 11.

(1) Time T:

Similarly to the present embodiment, video information D1 corresponding to five frames ranging from the frames 3 to 7 are read from the hard disk 11 and written into the buffer memory 13B at this time (see FIG. 5).

At this time T, a frame number for video information D1 outputted from the buffer memory 13A to the reproducing means 14 is determined. A playback frame number for the video information D1 to be outputted to the reproducing means 14 is different from that in the present embodiment and calculated from the following equation (5):

Playback frame number=[playback velocity integrated information]+[playback velocity information]  (5)

Since an externally-instructed playback velocity Vin is equal to S1=0.6-time velocity, the corresponding playback frame number is as follows:

$$\text{Playback frame number} = 0 + 0.6$$

$$= 0.6$$

If the number below the decimal point is dropped, then the corresponding playback frame number is given as a frame 0. Thus, at the time T, video information D1 corresponding to the frame 0 is outputted from the buffer memory 13A to the reproducing means 14.

(2) Time T+1:

Since the playback velocity integrated information is represented as 0.6 and the playback velocity Vin is equal to S2=0.3-time velocity at this time, the corresponding playback frame number for video information D1 to be outputted to the reproducing means 14 is obtained from the above equation (5):

$$\text{Playback frame number} = 0.6 + 0.3$$

$$= 0.9$$

The number below the decimal point is discarded and hence the corresponding playback frame number is given as the frame 0. Thus, video information D1 corresponding to the frame 0 is outputted from the buffer memory 13A to the reproducing means 14 at the time T+1.

(3) Time T+2:

Since the playback velocity integrated information is given as 0.9 and the playback velocity Vin is equal to S3=0.1-time velocity at this time, the corresponding playback frame number for video information D1 to be outputted to the reproducing means 14 is obtained from the above equation (5):

$$\text{Playback frame number} = 0.9 + 0.1$$
$$= 1.0$$

The number below the decimal point is discarded and hence the corresponding playback frame number results in a frame 1. Thus, video information D1 corresponding to the frame 1 is outputted from the buffer memory 13A to the reproducing means 14 at the time T+2.

(4) Time T+3:

Since the playback velocity integrated information is given as 1.0 and the playback velocity Vin is equal to S4=0-time velocity at this time, the corresponding playback frame number for video information D1 to be outputted to the reproducing means 14 is determined from the above equation (5):

$$\text{Playback frame number} = 1.0 + 0$$
$$= 1.0$$

Thus, video information D1 corresponding to the frame 1 is sequentially outputted from the buffer memory 13A to the reproducing means 14 at the time T+3.

(5) Time T+4:

Since the playback velocity integrated information is given as 1.0 and the playback velocity Vin is equal to S5=0-time velocity at this time, the corresponding playback frame number for video information D1 to be outputted to the reproducing means 14 is obtained from the above equation (5):

$$\text{Playback frame number} = 1.0 + 0$$
$$= 1.0$$

Thus, video information D1 corresponding to the frame 1 is further continuously outputted from the buffer memory 13A to the reproducing means 14.

(6) Time T+5:

At this time, a playback frame number for video information D1 to be written into the buffer memory 13A from the hard disk 11 is determined. A time interval required until the next bank switching is executed, corresponds to five frames. Assuming that no change occurs in the playback velocity Vin used till the next bank switching, video information D1 corresponding the playback frame number, to be played back or reproduced at the next bank switching is calculated from the aforementioned expression (1):

$$\text{Playback frame number} = 1.0 + 5 \times 0$$
$$= 1.0$$

If the number below the decimal point is dropped, then the corresponding playback frame number is given as a frame 1.

Accordingly, video information D1 corresponding to the frames 1 to 5 are read from the hard disk 11 and written into the buffer memory 13A.

Thus, the video information D1 corresponding to the frame numbers shown in FIG. 7 are stored in the buffer memories 13A and 13B respectively.

At this time T+5, a playback frame number for video information D1 outputted from the buffer memory 13B to the reproducing means 14 is determined. Here, the bank switching occurs and hence the video information D1 from the buffer memory 13B is outputted to the reproducing means 14. Since the playback velocity integrated information is given as 1.0 and the playback velocity Vin is equal to S6=0-time velocity, the playback frame number for the video information D1 to be outputted to the reproducing means 14 is calculated from the above equation (5):

$$\text{Playback frame number} = 1.0 + 0$$
$$= 1.0$$

If the number below the decimal point is discarded, then the corresponding frame number is brought to a frame 1.

Although the video information D1 to be outputted to the reproducing means 14 results in the frame 1 at the time T+5 in the system wherein the playback velocity Vin is not restricted based on the maximum playback velocity Vmax and the minimum playback velocity Vin as described above, the video information D1 corresponding to the frame 1 is not stored in the buffer memory 13B. Therefore, the video information D1 corresponding to the nearest frame 3 is outputted. Thus, the video information D1 to be outputted to the reproducing means 14 is brought to the frame 3 so that it jumps from the frame 1 to the frame 3, i.e., a so-called frame jump is produced.

INDUSTRIAL APPLICABILITY

The present invention can be applied to an image or video editing device using a variable-velocity playback type digital video recording and reproducing device.

What is claimed is:

1. A recording and reproducing device, comprising:
   recording means for storing video information corresponding to n frames (where n=0, 1, 2, 3 . . . );
   two memories for inputting video information corresponding to continuous m frames (where m<n) from said recording means and outputting the video information while performing alternate switching between a function for writing the video information there in and a function for reading the video information therefrom;
   reproducing means for playing back the video information outputted from said memories;
   instructing means for designating a velocity for playing back the video information by said reproducing means; and
   control means for performing control for alternately writing the video information corresponding to the m frames made continuous so that video information corresponding to several frames overlap, into said two memories based on the playback velocity specified by said instructing means, and performing control for determining a slow reproducible playback velocity range according to the video information corresponding to the m frames, correcting the playback velocity given by said instructing means so as to fall within said playback velocity range, and thereafter alternately reading the video information into said reproducing means from said memories based on the corrected playback velocity.

2. The recording and reproducing device according to claim 1, wherein when control for alternately writing video information corresponding to m frames made continuous so that video information corresponding to several frames overlap, into said two memories is performed, a maximum playback velocity is calculated from the present playback position of video information read from one of said memories, a playback position of video information corresponding to an overlap read latest with the present playback position as the reference, and a time interval required to change from a reading function of said one memory to a reading function of the other of said memories, a minimum playback velocity is calculated from the present playback position of the video information read from said one memory, a playback position of video information corresponding to an overlap read fastest with the present playback position as the reference, and a time interval required to change the reading function of said one memory to the reading function of said other memory, said maximum playback velocity, said minimum playback velocity and the playback velocity specified by said instructing means are respectively compared with each other, and the maximum playback velocity is set as a target playback velocity when the playback velocity is greater than the maximum playback velocity, said minimum playback velocity is set as a target playback velocity when the playback velocity is smaller than the minimum playback velocity, and said specified playback velocity is set as a target playback velocity when the playback velocity falls within a range from the minimum playback velocity to the maximum playback velocity, whereby a frame for video information read into said reproducing means from said each memory is determined.

3. A method of reproducing video information on a varying-velocity basis, comprising the following steps of:

reading video information corresponding to continuous m frames (where m<n), including overlapped video information corresponding to several frames from video information corresponding to n frames (where n=0, 1, 2, 3 . . . ), based on an externally-instructed playback velocity;

alternately writing the read video information corresponding to the m frames into two memory areas;

determining a slow reproducible playback velocity range from the video information corresponding to the m frames, including the overlapped video information;

correcting the externally-instructed playback velocity so as to fall within said playback velocity range; and alternately reading the video information from the two memory areas based on the corrected playback velocity and reproducing the read video information.

* * * * *